(12) United States Patent
Guillez et al.

(10) Patent No.: US 7,000,973 B2
(45) Date of Patent: Feb. 21, 2006

(54) PIVOTING CONVERTIBLE ROOF FOR A MOTOR VEHICLE

(75) Inventors: Jean-Marc Guillez, Cirieres (FR); Gérard Queveau, Le Pin (FR); Paul Queveau, Montravers (FR)

(73) Assignee: Societe Europeenne de Brevets Automobiles, Paris (FR)

(*) Notice: Subject to any disclaimer, the term of this patent is extended or adjusted under 35 U.S.C. 154(b) by 0 days.

(21) Appl. No.: 10/505,989

(22) PCT Filed: Feb. 20, 2003

(86) PCT No.: PCT/FR03/00566

§ 371 (c)(1),
(2), (4) Date: Aug. 26, 2004

(87) PCT Pub. No.: WO03/072382

PCT Pub. Date: Sep. 4, 2003

(65) Prior Publication Data

US 2005/0231001 A1    Oct. 20, 2005

(30) Foreign Application Priority Data

Feb. 27, 2002  (FR)  .................................. 02 02484

(51) Int. Cl.
*B60J 7/00* (2006.01)
(52) U.S. Cl. .................. 296/107.08; 296/108
(58) Field of Classification Search .......... 296/107.08, 296/108, 107.17, 107.18, 107.2
See application file for complete search history.

(56) References Cited

U.S. PATENT DOCUMENTS

| | | | |
|---|---|---|---|
| 5,785,375 A * | 7/1998 | Alexander et al. .......... 296/108 |
| 5,979,970 A * | 11/1999 | Rothe et al. ............ 296/107.17 |
| 6,217,104 B1 * | 4/2001 | Neubrand .............. 296/107.08 |
| 6,312,042 B1 * | 11/2001 | Halbweiss et al. .......... 296/108 |
| 6,431,636 B1 * | 8/2002 | Schutt ........................ 296/108 |
| 6,786,527 B1 * | 9/2004 | Guillez et al. ......... 296/107.08 |
| 6,786,528 B1 * | 9/2004 | Guillez et al. .............. 296/108 |
| 6,796,598 B1 * | 9/2004 | Guillez et al. .............. 296/108 |
| 6,830,282 B1 * | 12/2004 | Guillez et al. ......... 296/107.08 |
| 6,830,284 B1 * | 12/2004 | Guillez et al. .............. 296/108 |

(Continued)

FOREIGN PATENT DOCUMENTS

FR     2792884 A1 *  11/2000

(Continued)

*Primary Examiner*—Kiran B. Patel
(74) *Attorney, Agent, or Firm*—Nawrocki, Rooney & Sivertston, P.A.

(57) ABSTRACT

The invention relates to a pivoting convertible roof for a motor vehicle. The inventive roof comprises numerous rigid roof elements (1, 2, 3) which can be moved between a first position, in which they cover the passenger compartment (5) of the vehicle, and a second position, in which they are stored inside the boot (4) of the vehicle such that they are stacked more or less horizontally under the hood (4a) of said boot (4). According to the invention, the assembly of roof elements (1, 2, 3), which are stored inside the boot (4), is mounted to pivot in relation to an axle (8) that is disposed inside the boot (4). In this way, said assembly can be raised upwards when the hood (4a) of the boot (4) is being opened or after said hood has been opened in a forward manner.

8 Claims, 3 Drawing Sheets

U.S. PATENT DOCUMENTS

| | | | |
|---|---|---|---|
| 6,860,541 B1 * | 3/2005 | Guillez et al. | 296/108 |
| 6,871,901 B1 * | 3/2005 | Stenvers et al. | 296/108 |
| 6,874,841 B1 * | 4/2005 | Guillez et al. | 296/108 |
| 6,921,124 B1 * | 7/2005 | Guillez et al. | 296/108 |
| 2003/0189355 A1 * | 10/2003 | Hahn et al. | 296/107.08 |
| 2004/0041434 A1 * | 3/2004 | Guillez | 296/107.2 |
| 2004/0155480 A1 * | 8/2004 | Willard | 296/107.08 |
| 2004/0189040 A1 * | 9/2004 | Wojciech et al. | 296/108 |

FOREIGN PATENT DOCUMENTS

| | | |
|---|---|---|
| FR | 2794073 A1 * | 12/2000 |
| FR | 2851748 A1 * | 9/2004 |
| FR | 2853593 A1 * | 10/2004 |
| WO | WO 236373 A2 * | 5/2002 |
| WO | WO 2053401 A1 * | 7/2002 |
| WO | WO 2004082972 A1 * | 9/2004 |

* cited by examiner

PIVOTING CONVERTIBLE ROOF FOR A MOTOR VEHICLE

The invention concerns a retractable roof for a vehicle comprising several rigid roof elements which can be moved between a position in which they cover the vehicle cabin and a position in which they are stored in the rear boot of the vehicle.

Such a retractable roof makes it possible to transform a vehicle of the saloon or coupe type into a vehicle of the cabriolet type.

In many designs, the roof elements, when they are stored inside the rear boot of the vehicle, are superimposed on each other and lie substantially horizontally under the boot lid.

In this position, there remains, inside the boot, under the superimposed roof elements, a space for storing luggage.

However, the threshold for access inside the boot, that is to say the distance between the rear edge of the bottom roof element and the rear edge of the access opening to the boot, is limited, which interferes with the introduction of luggage inside the boot.

There is known, from the French patent application filed in the name of the applicant under the number 0101507, a means for facilitating the introduction of luggage inside the boot by increasing, when the boot is opened, the distance lying between the rear edge of the boot opening and the rear part of the bottom roof element.

In this embodiment, the rear roof element, which is the bottom element when the roof elements are superimposed, comprises on its rear part a finger engaged in a runner which enables the roof elements to be stored inside the boot.

When the roof elements are stored in the boot, an upward movement of the rear part of the rear roof element is made possible by means of translating the said finger with respect to the rear element and by the action of a cylinder fixed to the rear element.

These known devices have the drawback of requiring the use of a cylinder as well as translation means fitted on a moving roof element. This configuration increases the weight of the moving roof elements and the fitted devices have a restricted service life through their mobility.

The aim of the invention is to remedy these drawbacks.

The invention thus relates to a retractable roof for a vehicle, comprising several rigid roof elements able to be moved between a position in which they cover the vehicle cabin and a position in which they are stored inside the rear boot of the vehicle, superimposed substantially horizontally under the lid of the rear boot, all the roof elements, stored inside the rear boot, being mounted so as to pivot on an axis situated inside the boot, so that it is possible to raise this assembly upwards when the lid of the boot is opened or after opening thereof from rear to front; the said rigid roof elements comprise at least one rear element whose movement towards the boot is guided by a runner extending inside the boot in which there is engaged a finger fixed to the rear of the rear element.

According to the invention, the said runner comprises a raising portion as from its end forming an end of travel for the said finger when the roof elements are stored inside the vehicle boot, and an actuation device fixed to the vehicle chassis is arranged so as to move the said finger between its end of travel position and a position in which it is disposed in the said raising portion of the runner.

According to one embodiment, the said actuation device comprises a lever mounted so as to pivot about an axis with respect to the runner, the said actuation device also comprising a cylinder fixed to the vehicle chassis and able to move the said lever between a position where it is substantially in line with the runner and a position where the lever holds the finger in the raising portion of the runner.

The said lever can have a hook shape at its end opposite to its pivot axis so as to drive the finger upwards or downwards.

The hook-shaped part of the said lever can also be able to control the movement of the said finger of the raising portion as far as its position at the end of travel of the runner.

Moreover, the movement of all the superimposed roof elements towards the boot can be controlled by a pivoting arm articulated at a fixed point on the bodywork and at a point situated close to the front of the rear element, all the roof elements stored inside the boot then being mounted so as to pivot about the point of articulation of the said arm situated close to the front of the rear element.

Also in one embodiment, the runner comprises a first portion intended to cooperate with the said finger during the storage of the roof elements in the boot, and a second portion forming the said raising portion, this second portion extending in the same plane and substantially at a right angle from one of the ends of the said first portion.

The said runner raising portion can describe an arc of a circle whose centre is the pivot axis of the roof elements.

The control of the said cylinder can be carried out simultaneously with the opening of the boot lid, when the roof elements are in position stored in the boot.

Other characteristics and advantages of the invention will emerge in the light of the description given below and the drawings, in which:

FIGS. 1 to 3 illustrate the functioning of a retractable roof of a motor vehicle.

The roof comprises at least two rigid elements.

In the embodiment depicted in the figures, the roof comprises three rigid elements: a front element 1, an intermediate element 2 and a rear element 3 as well as sliding and/or pivoting means enabling these three elements to be superimposed and stored in the rear boot 4.

Figure 1:
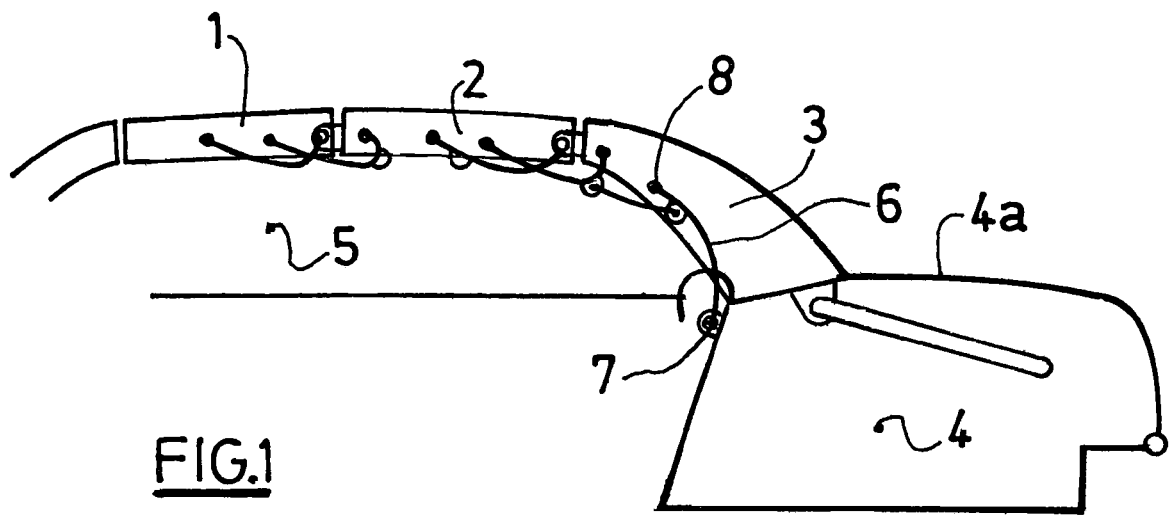
FIG. 1 is a partial schematic view of a vehicle equipped with a retractable roof in the closed position.

FIG. 1 shows the roof in the closed position, that is to say covering the cabin 5, enabling the vehicle to behave as a conventional vehicle with fixed roof.

Figure 2:
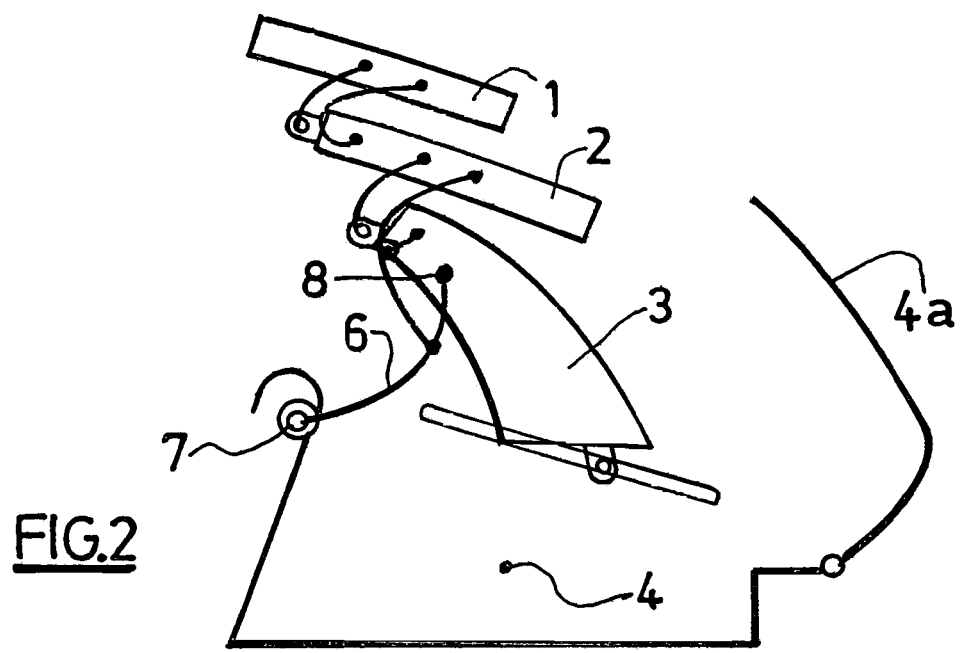
FIG. 2 is a schematic view of the vehicle boot in FIG. 1, the movable roof elements being in the course of storage in the boot.
Figure 3:
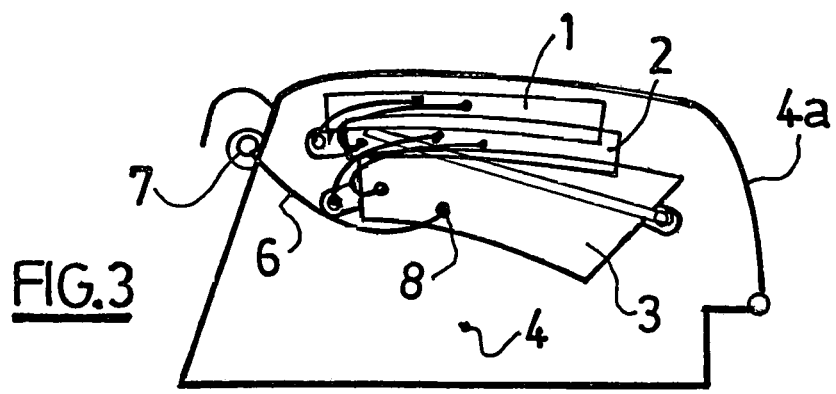
FIG. 3 is a view similar to FIG. 2 in which the roof elements are stored inside the boot.

FIG. 2 shows the movable roof elements 1, 2, 3 in the course of superimposition and storage in the boot 4, this manoeuvre resulting in the stored position visible in FIG. 3.

Figure 4:
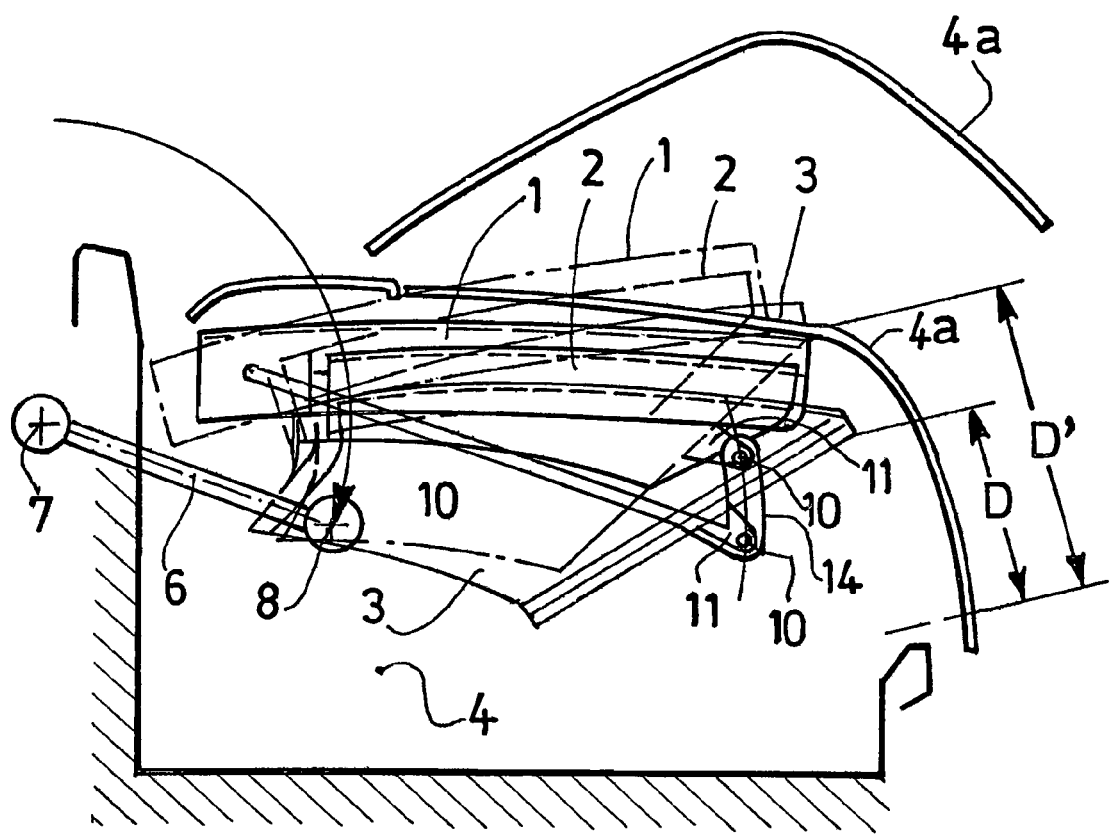
FIG. 4 depicts the rear boot of a vehicle equipped with a retractable roof according to the invention in position stored in the boot.

FIG. 4 depicts the retractable roof according to the invention comprising three elements 1, 2, 3 in the stored position.

The movement of the elements 1, 2, 3 during their storage in the boot is controlled by a pivoting arm 6 articulated at a fixed point 7 on the bodywork and connected pivotally to a shaft 8 fixed to the rear roof element 3.

The said shaft 8 forms a rotation axis enabling the roof elements, when they are superimposed and form an assembly stored in the boot 4, to pivot between a low position (depicted in continuous lines in FIG. 4) and a high position (depicted in dotted lines).

All the elements 1, 2, 3 are able to adopt the high position when the lid 4*a* of the boot 4 is open.

The movement of the rear element 3 towards the boot 4 during the storage operation is also guided by a runner 9 extending inside the boot 4 in which there is engaged a finger 10, or roller 10, fixed to the rear 11 of the rear element 3.

A hook 12 is mounted so as to turn about a shaft 13 on the runner 9, at the end thereof corresponding to the end of travel of the finger 10 when the rear element is in the stored position.

The hook 12 is also controlled by a cylinder 15 attached by a fixing 16 to the runner 9. This cylinder 15 enables the hook 12 to move between the two positions depicted in FIG. 6.

In addition, the runner 9 also comprises a raising portion 14 consisting of a curved extension of the said runner 9 from its end mentioned previously, this raising portion 14 describing an arc of a circle whose centre is the shaft 8.

Figure 5:
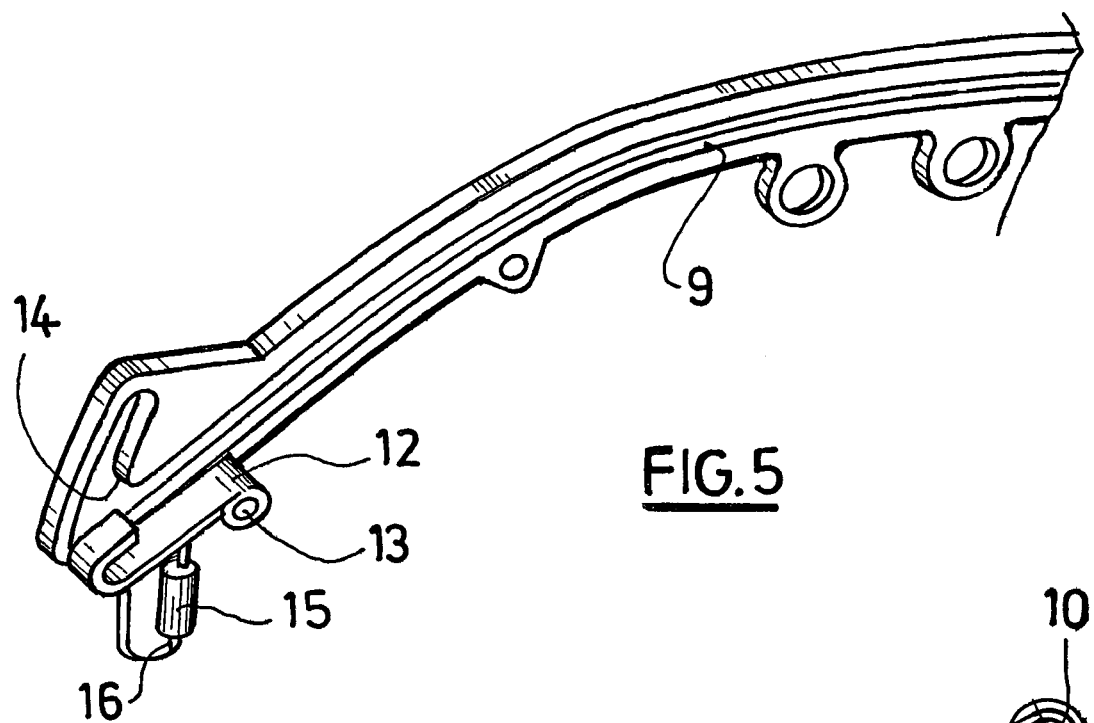
FIG. 5 is a perspective view of the runner extending in the boot depicted in FIG. 4.

In the initial position, the cylinder 15 holds the hook 12 in line with the runner 9, as depicted in FIG. 5.

Thus, when the retractable roof is controlled so as to adopt its position stored in the boot 4, the finger 10 fixed to the rear part 11 of the rear roof element 3 runs along the runner 9 in the direction of the hook 12.

At the end of travel along the runner 9, a clearance remains between the finger 10 and the bottom of the hook 12.

The finger 10 is then housed in the curved part of the hook 12 and all the roof elements 1, 2, 3 are situated in the low position, depicted in continuous lines in FIG. 4. This position also corresponds to that of the hook 12 in line with the runner 9, visible in FIG. 6.

When the lid 4*a* of the boot 4 is open, all the elements 1, 2, 3 superimposed in the boot 4 pivot upwards, about their shaft 8.

Figure 6:
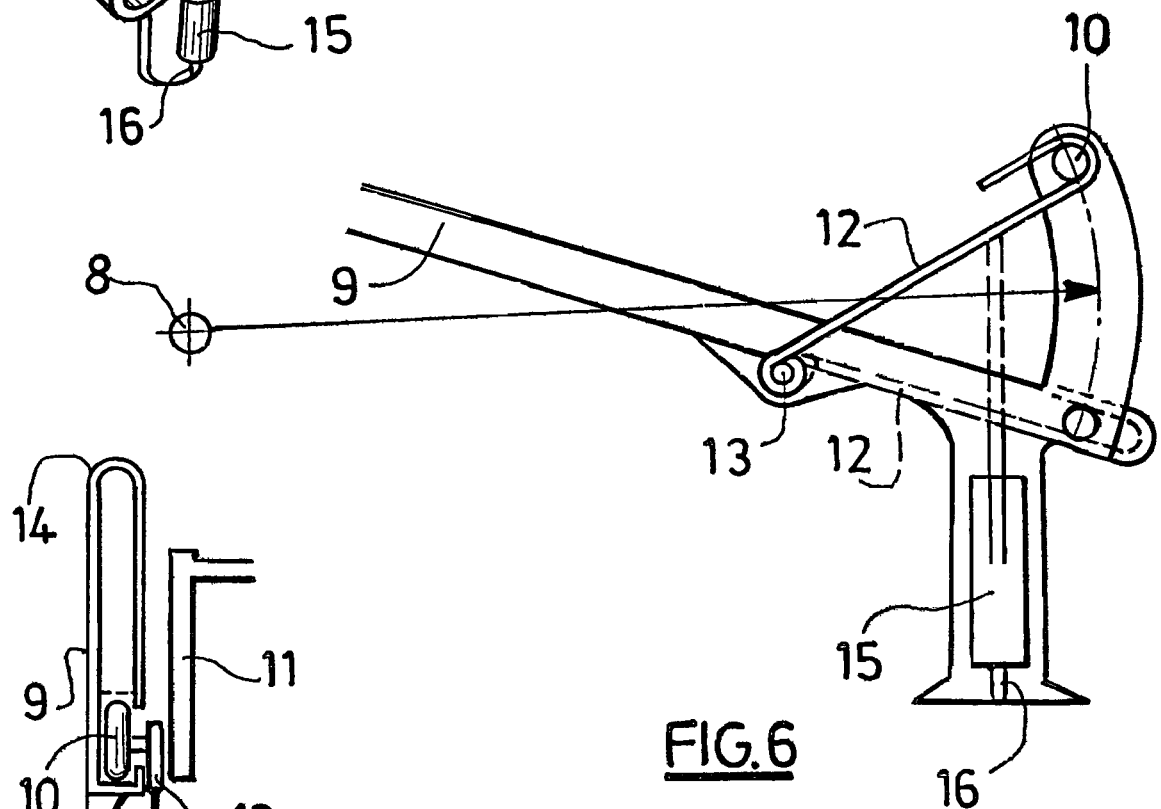
FIG. 6 is a side view of the actuation device visible in FIG. 5.
Figure 7:
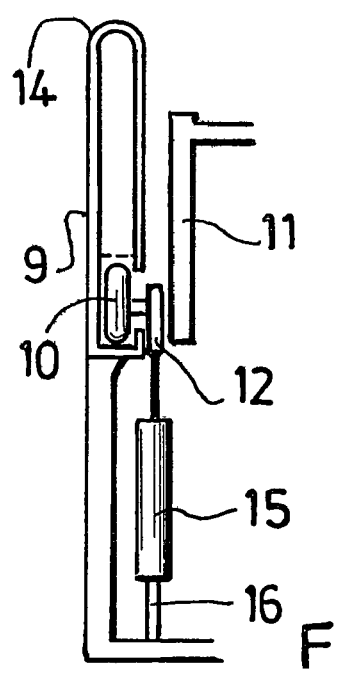
FIG. 7 is a front view of the device of FIG. 6.

For this purpose, the cylinder 15 is actuated in order to control the movement of the curved part of the hook 12 towards the raising portion 14 of the runner 9 and consequently so as to dispose the finger 10 in this raising portion 14. This configuration is depicted in FIG. 6, the cylinder 15 being in the position indicated in dotted lines.

When the hook 12 rises in the raising portion 14, the finger 10 rises.

The travel of the finger 10 is substantially rectilinear.

The hook 12 describes an arc of a circle.

When the hook 12 rises, the finger 10 moves in towards the bottom of the hook 12. Such a movement towards the bottom of the hook 12 is made possible by virtue of the clearance specified above.

The high position of all the superimposed roof elements 1, 2, 3 is depicted in FIG. 4 in dotted lines.

This high position of the roof elements 1, 2, 3 makes it possible to obtain a space D' between the rear of the boot opening 4 and the rear part of the rear roof element 3, in place of the space D corresponding to the initial position, and thus allows easier introduction of luggage into the boot 4.

Likewise the cylinder 15 can be actuated so as to control the return of the assembly 1, 2, 3 from its high position to its low position.

To this end, the cylinder 15 is controlled so as to return the hook 12 to the initial position in which it is substantially in line with the runner 9, the hook shape allowing the driving of the finger 10 downwards.

In the case of a boot 4 with electro-hydraulic opening, the cylinder 15 can be actuated for the raising of the assembly 1, 2, 3 simultaneously with the opening of the lid 4*a* of the boot 4.

In the case of manual opening, a handle controlling the cylinder 15 can be located under the rear roof element 3, so as to be accessible to the user.

The movable roof elements 1, 2, 3 thus comprise no attached device, the raising of these elements when they are superimposed being effected by the assembly consisting of cylinder 15 and hook 12 cooperating with the raising portion 14 of the runner 9.

What is claimed is:

1. A retractable roof for a vehicle, comprising several rigid roof elements (1, 2, 3) able to be moved between a position in which they cover the vehicle cabin (5) and a position in which they are stored inside the rear boot (4) of the vehicle, superimposed substantially horizontally under the lid (4*a*) of the rear boot (4), all the roof elements (1, 2, 3), stored inside the rear boot (4), being mounted so as to pivot on an axis (8) situated inside the boot (4), so that it is possible to raise this assembly upwards when the lid (4*a*) of the boot (4) is opened or after opening thereof from rear to front; the said rigid roof elements comprise at least one rear element (3) whose movement towards the boot (4) is guided by a runner (9) extending inside the boot (4) in which there is engaged a finger (10) fixed to the rear of the rear element (3); the retractable roof being characterised in that the said runner (9) comprises a raising portion (14) as from its end forming an end of travel for the said finger (10) when the roof elements (1, 2, 3) are stored inside the vehicle boot (4), and in that an actuation device (12, 15) fixed to the vehicle chassis is arranged so as to move the said finger (10) between its end of travel position and a position in which it is disposed in the said raising portion (14) of the runner (9).

2. A retractable roof according to claim 1, characterised in that the said actuation device comprises a lever (12) mounted so as to pivot about an axis (13) with respect to the runner (9), the said actuation device also comprising a cylinder (15) fixed to the vehicle chassis and able to move the said lever (12) between a position where it is substantially in line with the runner (9) and a position where the lever (12) holds the finger (10) in the raising portion (14) of the runner (9).

3. A retractable roof according to claim 2, characterised in that the said lever (12) has a hook shape at its end opposite to its pivot axis (13) so as to drive the finger (10) upwards or downwards.

4. A retractable roof according to claim 3, characterised in that the hook-shaped part of the said lever (12) is able to control the movement of the said finger (10) of the raising portion (14) as far as its position of end of travel of the runner (9).

5. A retractable roof according to claim 1, characterised in that the movement of all the superimposed roof elements (1, 2, 3) towards the boot (4) is controlled by a pivoting arm articulated at a fixed point (7) on the bodywork and at a point (8) situated close to the front of the rear element (3), characterised in that all the roof elements (1, 2, 3) stored inside the boot (4) are mounted so as to pivot about the point of articulation (8) of the said arm situated close to the front of the rear element (3).

6. A retractable roof according to claim 1, characterised in that the runner (9) comprises a first portion intended to cooperate with the said finger (10) during the storage of the roof elements (1, 2, 3) in the boot (4), and a second portion (14) forming the said raising portion, this second portion (14) extending in the same plane and substantially at a right angle from one of the ends of the said first portion.

7. A retractable roof according to claim 2, characterised in that the said raising portion (14) of the runner (9) describes an arc of a circle whose centre is the pivot axis (8) of the roof elements (1, 2, 3).

8. A retractable roof according to claim 2, characterised in that the control of the said cylinder (15) is effected simultaneously with the opening of the lid (4a) of the boot (4), when the roof elements (1, 2, 3) are in position stored in the boot (4).

* * * * *